United States Patent
Hosseini

(10) Patent No.: US 11,824,608 B2
(45) Date of Patent: Nov. 21, 2023

(54) CHANNEL STATE INFORMATION (CSI) PROCESSING UNIT PROCEDURES FOR CSI REPORT PRE-EMPTION

(71) Applicant: QUALCOMM Incorporated, San Diego, CA (US)

(72) Inventor: Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/248,469

(22) Filed: Jan. 26, 2021

(65) Prior Publication Data
US 2021/0250074 A1 Aug. 12, 2021

Related U.S. Application Data

(60) Provisional application No. 62/972,466, filed on Feb. 10, 2020.

(51) Int. Cl.
*H04B 7/06* (2006.01)
*H04W 76/30* (2018.01)
(Continued)

(52) U.S. Cl.
CPC ...... *H04B 7/0626* (2013.01); *H04W 72/0446* (2013.01); *H04W 72/0453* (2013.01); *H04W 72/23* (2023.01); *H04W 76/30* (2018.02)

(58) Field of Classification Search
None
See application file for complete search history.

(56) References Cited

U.S. PATENT DOCUMENTS 11,601,922 B1 * 3/2023 Chu .................... H04W 72/121
2020/0112869 A1 * 4/2020 Kim .................... H04B 7/0632
(Continued)

FOREIGN PATENT DOCUMENTS

WO   WO-2019222876 A1   11/2019

OTHER PUBLICATIONS

"3rd Generation Partnership Project, Technical Specification Group Radio Access Network, NR, Physical Layer Procedures for Data (Release 16)", 3GPP Standard, Technical Specification, 3GPP TS 38.214, 3rd Generation Partnership Project (3GPP), Mobile Competence Centre, 650, Route Des Lucioles, F-06921, Sophia-Antipolis Cedex, France, vol. RAN WG1, No. V16.0.0, Dec. 2019, Jan. 14, 2020 (Jan. 14, 2020), XP051860777, pp. 1-147, Retrieved from the Internet: URL: http://ftp.3gpp.org/Specs/archive/38_series/38.214/38214-g00.zip 38214-g00.docx [retrieved on Jan. 14, 2020] sections 5.1.6.1-5.1.6.1.1, 5.1.6.3, 5.1.6.5, 5.2.1.4 and 5.2.25, paragraphs [5.2.1.5], [5.2.2], paragraph 5.2.1 .6, paragraph 5.4, paragraph 6.1, paragraph 5.1.6.1.2, paragraph 5.2.1.4.4.

(Continued)

*Primary Examiner* — Christopher T Wyllie
(74) *Attorney, Agent, or Firm* — Harrity & Harrity, LLP

(57) ABSTRACT

Various aspects of the present disclosure generally relate to wireless communication. In some aspects, a user equipment (UE) may determine that an uplink communication of the UE has been cancelled. The uplink communication includes a channel state information (CSI) report, and a set of CSI processing units of the UE are occupied for calculating CSI for the CSI report. The UE may release the set of CSI processing units associated with calculating CSI for the CSI report, based at least in part on determining that the uplink communication has been cancelled. Numerous other aspects are provided.

20 Claims, 7 Drawing Sheets

(51) Int. Cl.
*H04W 72/0453* (2023.01)
*H04W 72/0446* (2023.01)
*H04W 72/23* (2023.01)

(56) References Cited

U.S. PATENT DOCUMENTS

| | | | | |
|---|---|---|---|---|
| 2020/0145164 | A1* | 5/2020 | Cheng | H04W 52/265 |
| 2020/0196179 | A1* | 6/2020 | Kim | H04B 17/24 |
| 2020/0322944 | A1* | 10/2020 | Soriaga | H04W 72/51 |
| 2021/0045074 | A1* | 2/2021 | Manolakos | H04L 5/0057 |
| 2021/0067220 | A1* | 3/2021 | Abdelghaffar | H04B 7/0486 |
| 2021/0111776 | A1* | 4/2021 | Wu | H04L 5/0057 |
| 2021/0153129 | A1* | 5/2021 | Venugopal | H04W 80/02 |
| 2021/0176001 | A1* | 6/2021 | Li | H04L 1/0027 |
| 2021/0184812 | A1* | 6/2021 | MolavianJazi | H04L 1/0041 |
| 2021/0218453 | A1* | 7/2021 | Song | H04L 5/0023 |
| 2021/0250074 | A1* | 8/2021 | Hosseini | H04L 1/0027 |
| 2021/0298038 | A1* | 9/2021 | Kang | H04L 5/0057 |
| 2021/0307025 | A1* | 9/2021 | Hosseini | H04W 8/24 |
| 2021/0337415 | A1* | 10/2021 | Chen | H04W 24/10 |
| 2022/0103209 | A1* | 3/2022 | Hao | H04B 7/0456 |
| 2022/0321189 | A1* | 10/2022 | Wei | H04W 8/24 |
| 2022/0322336 | A1* | 10/2022 | Sridharan | H04L 5/0057 |
| 2022/0352950 | A1* | 11/2022 | Faxér | H04B 7/0626 |
| 2022/0386355 | A1* | 12/2022 | Yi | H04W 72/569 |
| 2023/0016768 | A1* | 1/2023 | Yang | H04L 5/0057 |

OTHER PUBLICATIONS

Ericsson: "Summary of Views on CSI Reporting v8", 3GPP Draft, 3GPP TSG RAN WG1 Meeting #92bis, R1-1805692, Summary Of Views On CSI Reporting V8, 3rd Generation Partnership Project (3GPP), Mobile Competence Centre; 650, Route Des Lucioles; F-06921, Sophia-Antipolis Cedex; France, vol. RAN WG1, No. Sanya, China, Apr. 16, 2018-Apr. 20, 2018, Apr. 19, 2018 (Apr. 19, 2018), XP051427816, pp. 1-24, Retrieved from the Internet: URL: http://www.3gpp.org/ftp/Meetings%5F3GPP%5FSYNC/RAN1/Docs/ [retrieved on Apr. 19, 2018] paragraph 2.1.

International Search Report and Written Opinion—PCT/US2021/070081—ISA/EPO—dated May 11, 2021.

Qualcomm Incorporated: "Uplink Inter-UE Tx Multiplexing and Prioritization", 3GPP Draft, 3GPP TSG-RAN WG1 #98b, R1-1911122, Uplink Inter-UE Tx Multiplexing and Prioritization, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14, 2019-Oct. 20, 2019, Oct. 8, 2019 (Oct. 8, 2019), XP051809292, 9 pages, Retrieved from the Internet: URL:https://ftp.3gpp.org/tsg_ran/WG1_RL1/TSGR1_98b/Docs/R1-1911122.zip, R1-1911122, Uplink Inter-UE Tx Multiplexing and Prioritization.docx [retrieved on Oct. 8, 2019], Section "2.3 Applicability of UL Cancellation Indication to Uplink channels". paragraph 2.2, figure 3, The whole document.

Qualcomm: "Remaining Issues on UCI Enhancements for URLLC," 3GPP Draft, 3GPP TSG RAN WG1 #101e, R1-2004458, 3rd Generation Partnership Project (3GPP), Mobile Competence Centre; 650, Route Des Lucioles; F-06921, Sophia-Antipolis Cedex; France, vol. RAN WG1, No. 20200525-20200605, May 16, 2020 (May 16, 2020), XP051886187, pp. 1-15, Retrieved from the Internet: URL: https://ftp.3gpp.org/tsg_ran/WG1_RL1/TSGR1_101-e/Docs/R1-2004458.zip R1-2004458 Remaining issues on UCI Enhancements for URLLC.docx [retrieved on May 16, 2020] paragraph 8.

* cited by examiner

CHANNEL STATE INFORMATION (CSI) PROCESSING UNIT PROCEDURES FOR CSI REPORT PRE-EMPTION

CROSS-REFERENCE TO RELATED APPLICATION

This Patent Application claims priority to U.S. Provisional Patent Application No. 62/972,466, filed on Feb. 10, 2020, entitled "CHANNEL STATE INFORMATION (CSI) PROCESSING UNIT PROCEDURES FOR CSI REPORT PRE-EMPTION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for channel state information (CSI) processing unit procedures for CSI report pre-emption.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that an uplink communication of the UE has been cancelled. The uplink communication includes a channel state information (CSI) report, and a set of CSI processing units of the UE are occupied for calculating CSI for the CSI report. The method may include releasing the set of CSI processing units associated with calculating CSI for the CSI report, based at least in part on determining that the uplink communication has been cancelled.

In some aspects, a method of wireless communication, performed by a UE, may include determining that an uplink communication of the UE has been cancelled. The uplink communication includes a CSI report, and a set of CSI processing units of the UE are occupied for calculating CSI for the CSI report. The method may include maintaining the set of CSI processing units as occupied until a last symbol for the CSI report.

In some aspects, a UE for wireless communication may include a memory and one or more processors operatively coupled to the memory. The memory and the one or more processors may be configured to determine that an uplink communication of the UE has been cancelled. The uplink communication includes a CSI report, and a set of CSI processing units of the UE are occupied for calculating CSI for the CSI report. The memory and the one or more processors may be configured to release the set of CSI processing units associated with calculating CSI for the CSI report, based at least in part on determining that the uplink communication has been cancelled.

In some aspects, a UE for wireless communication may include a memory and one or more processors operatively coupled to the memory. The memory and the one or more processors may be configured to determine that an uplink communication of the UE has been cancelled. The memory and the one or more processors may be configured to maintain the set of CSI processing units as occupied until a last symbol for the CSI report.

In some aspects, a non-transitory computer-readable medium may store one or more instructions for wireless communication. The one or more instructions, when executed by one or more processors of a UE, may cause the one or more processors to determine that an uplink communication of the UE has been cancelled, where the uplink communication includes a CSI report, and a set of CSI processing units of the UE are occupied for calculating CSI for the CSI report, and release the set of CSI processing units associated with calculating CSI for the CSI report, based at least in part on determining that the uplink communication has been cancelled.

In some aspects, a non-transitory computer-readable medium may store one or more instructions for wireless communication. The one or more instructions, when executed by one or more processors of a UE, may cause the one or more processors to determine that an uplink communication of the UE has been cancelled, where the uplink communication includes a CSI report, and a set of CSI processing units of the UE are occupied for calculating CSI for the CSI report, and maintain the set of CSI processing units as occupied until a last symbol for the CSI report.

In some aspects, an apparatus for wireless communication may include means for determining that an uplink communication of the apparatus has been cancelled, where the uplink communication includes a CSI report, and a set of CSI processing units of the apparatus are occupied for calculating CSI for the CSI report, and means for releasing the set of CSI processing units associated with calculating CSI for the CSI report, based at least in part on determining that the uplink communication has been cancelled.

In some aspects, an apparatus for wireless communication may include means for determining that an uplink communication of the apparatus has been cancelled, where the uplink communication includes a CSI report, and a set of CSI processing units of the apparatus are occupied for calculating CSI for the CSI report, and means for maintaining the set of CSI processing units as occupied until a last symbol for the CSI report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
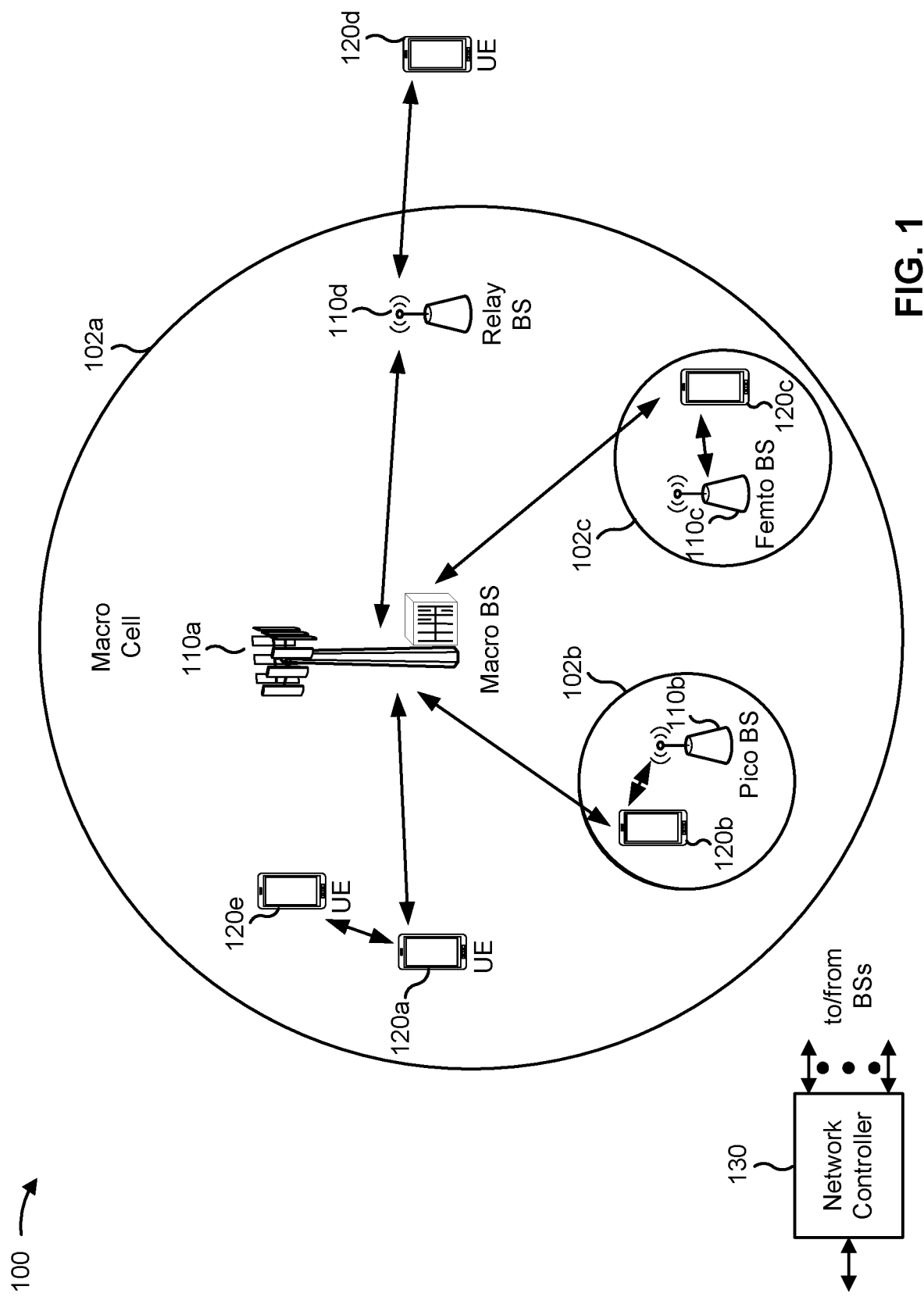
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
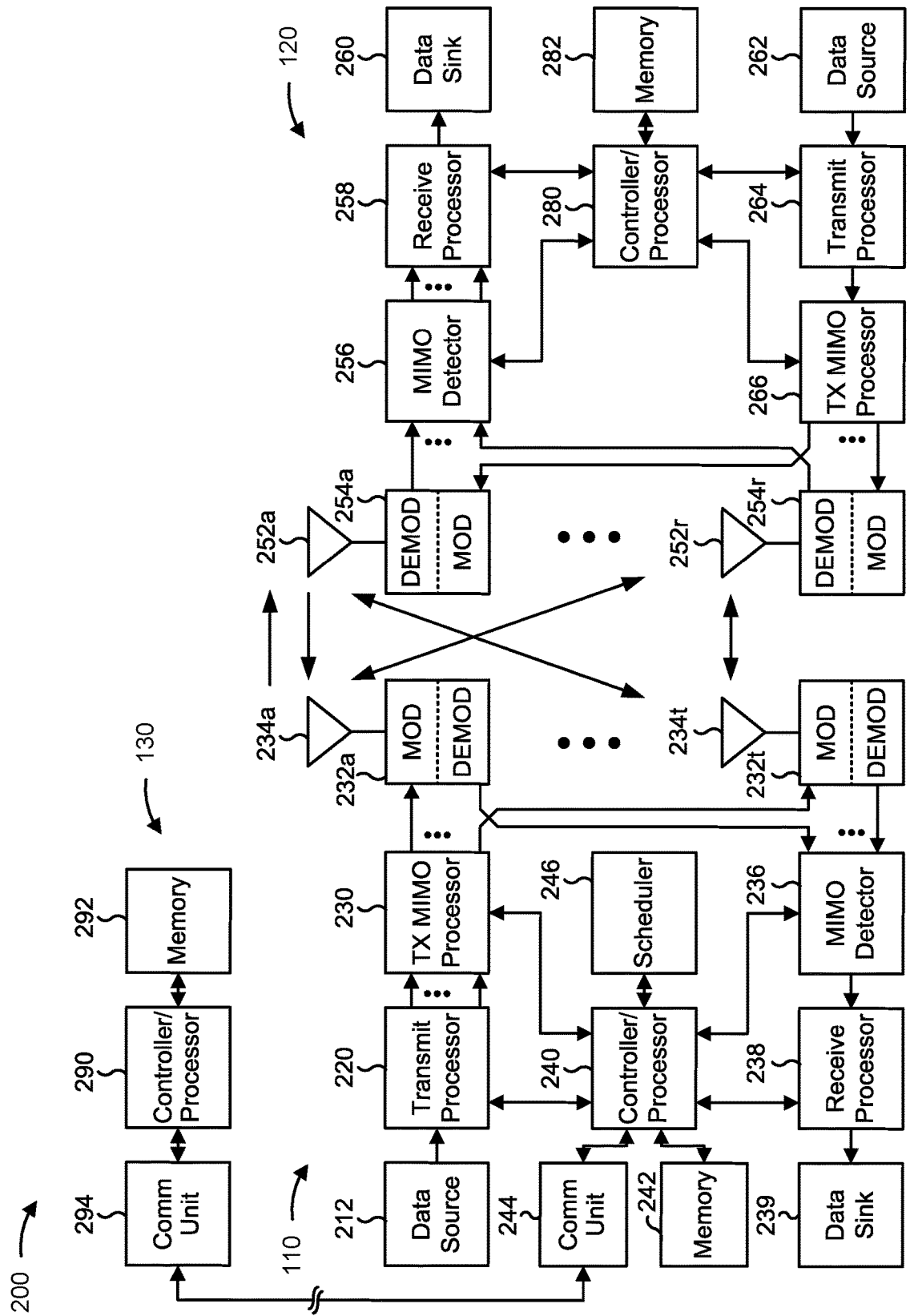
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information (CSI) processing unit procedures for CSI report pre-emption, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 6, process 700 of FIG. 7, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining that an uplink communication of the UE has been cancelled, where the uplink communication includes a CSI report, and a set of CSI processing units of the UE are occupied for calculating CSI for the CSI report, means for releasing the set of CSI processing units associated with calculating CSI for the CSI report, based at least in part on determining that the uplink communication has been cancelled, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining that an uplink communication of the UE has been cancelled, where the uplink communication includes a CSI report, and a set of CSI processing units of the UE are occupied for calculating CSI for the CSI report, means for maintaining the set of CSI processing units as occupied until a last symbol for the CSI report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
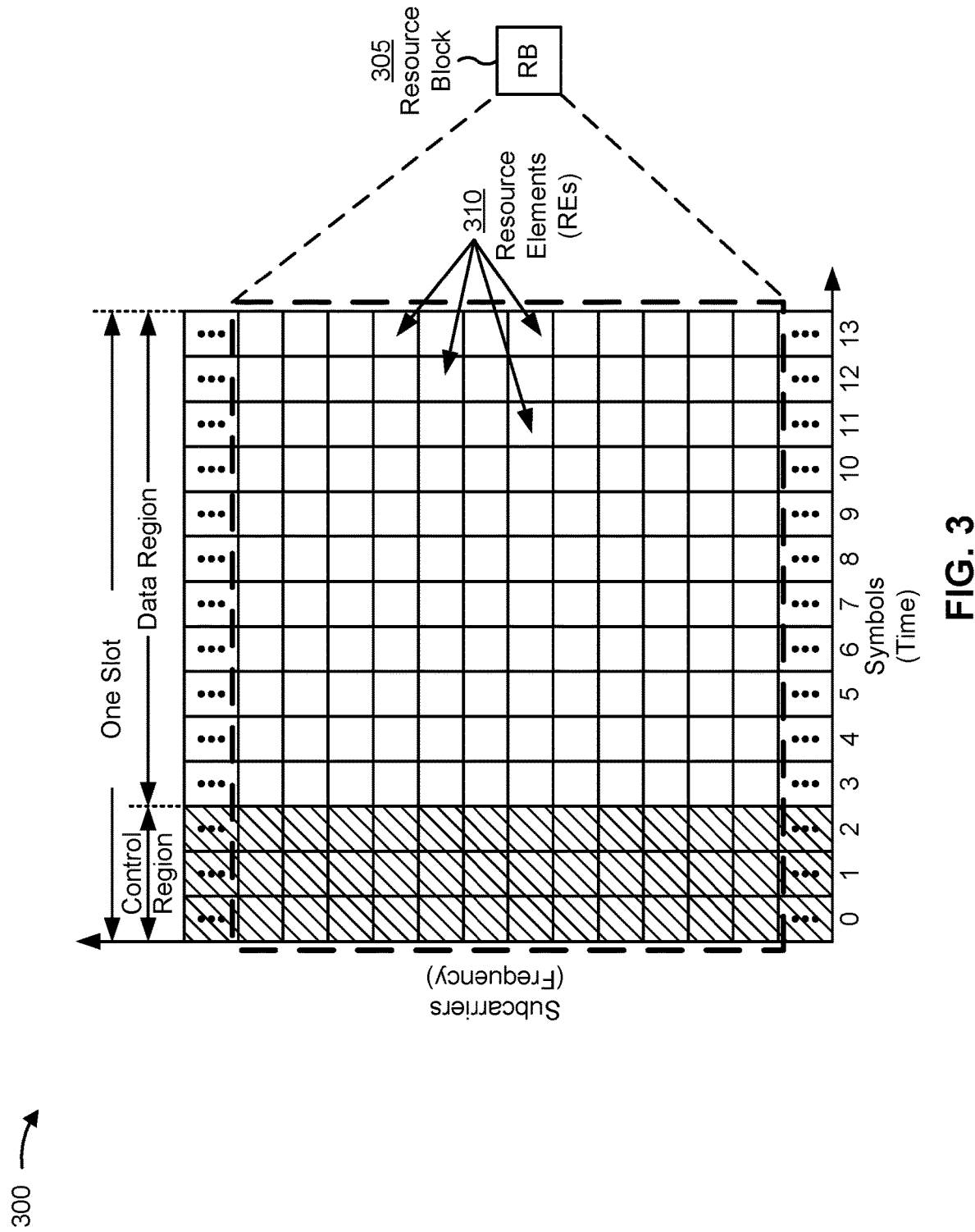
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

When determining whether to update CSI, a UE may determine a CSI (n) processing unit (CPU) occupancy for a CSI report, denoted as $O_{CPU}^{(n)}$ for a CSI report n. The UE may be capable of a quantity (e.g., a maximum number) of simultaneous CSI calculations, denoted as $N_{CPU}$. Additionally, or alternatively, the value of $N_{CPU}$ may indicate a quantity (e.g., a maximum number) of CPUs that the UE is capable of using to process a CSI report across all configured cells. In some aspects, the UE may report the value of $N_{CPU}$ to a base station, such as in a UE capability report. If L CPUs of the UE are occupied in a given OFDM symbol, then the UE may have $N_{CPU}$ minus L ($N_{CPU}$-L) unoccupied CPUs (e.g., CPUs available for performing a CSI calculation and/or processing a CSI report) in the OFDM symbol.

When performing CSI processing, the UE may drop one or more low priority CSI reports if the UE does not have enough available CPUs to process all CSI reports in a given OFDM symbol. Each CSI report n configured for the UE may be associated with a CPU occupancy $O_{CPU}^{(n)}$. Furthermore, each CSI report may be associated with a priority. In some cases, different CSI reports may be associated with different CPU occupancies and/or different priorities. Depending on the CPU occupancy of the CSI reports configured for the UE and/or requested by the base station, the UE is not required to update N minus M (N−M) requested CSI reports with the lowest priority (as compared to the other requested CSI reports, where 0≤M≤N is the largest value such that:

$$\Sigma_{n=0}^{M-1} O_{CPU}^{(n)} \leq N_{CPU} - L$$

In other words, the UE may determine whether the UE has sufficient CPUs available (e.g., unoccupied) in an OFDM symbol to process a highest priority CSI report based at least in part on a CPU occupancy of the highest priority CSI report. If the UE has sufficient CPUs available in the OFDM symbol to process the highest priority CSI report, then the UE may determine whether the UE has sufficient CPUs available in the OFDM symbol (after considering the CPUs needed to process the highest priority CSI report) to process a second-highest priority CSI report based at least in part on a CPU occupancy of the second-highest priority CSI report. When the UE determines that the UE does not have sufficient CPUs available in the OFDM symbol for a given CSI report, then the UE may refrain from performing CSI processing for the CSI report (e.g., may refrain from updating CSI for the given CSI report) and for any other CSI reports having a lower priority than the given CSI report. In this case, the UE may transmit previously-determined CSI in the CSI report (e.g., without updating the CSI).

A UE is not expected to be configured with an aperiodic CSI trigger state containing more than $N_{CPU}$ reporting settings. Processing of a CSI report may occupy a quantity of CPUs $O_{CPU}$ for a quantity of symbols. The quantity may be $O_{CPU}=0$ for a CSI report with CSI-ReportConfig with higher layer parameter reportQuantity set to "none" and CSI-RS-ResourceSet with higher layer parameter trs-Info configured. The quantity may be $O_{CPU}=1$ for a CSI report with CSI-ReportConfig with higher layer parameter reportQuantity set to "cri-RSRP", "ssb-Index-RSRP," or "none" (and CSI-RS-ResourceSet with higher layer parameter trs-Info not configured).

There are conditions for when a CSI report with CSI-ReportConfig with higher layer parameter reportQuantity is set to "cri-RI-PMI-CQI", "cri-RI-i1", "cri-RI-i1-CQI", "cri-RI-CQI", or "cri-RI-LI-PMI-CQI". If a CSI report is aperiodically triggered without transmitting on a physical uplink shared channel (PUSCH) with either a transport block or a hybrid automatic repeat request acknowledgement (HARQ-ACK) or both when L=0 CPUs are occupied, or where reportQuantity is set to "cri-RI-CQI", $O_{CPU}=N_{CPU}$. Otherwise, $O_{CPU}=K_s$, where $K_s$ may be the number of CSI-RS resources in the CSI-RS resource set for channel measurement.

For a CSI report with CSI-ReportConfig with higher layer parameter reportQuantity not set to "none", the CPUs may be occupied for a quantity of OFDM symbols. For example, a periodic or semi-persistent CSI report (excluding an initial semi-persistent CSI report on PUSCH after the physical downlink control channel (PDCCH) triggering the report) occupies CPUs from a first symbol of the earliest one of each CSI reference signal (CSI-RS)/CSI interference management (CSI-IM)/synchronization signal and physical broadcast channel (SSB) resource for channel or interference measurement until a last symbol of the PUSCH or PUCCH carrying the report. The PUSCH or PUCCH for a semi-persistent CSI report may be considered to be a scheduled PUSCH or a configured PUSCH or PUCCH. The PUCCH for a periodic CSI report may be considered to be a configured PUCCH.

An aperiodic CSI report may occupy CPUs from the first symbol after the PDCCH triggering the CSI report until the last symbol of the PUSCH carrying the report. The PUSCH for an aperiodic CSI report may be considered to be a scheduled PUSCH. An initial semi-persistent CSI report on PUSCH after the PDCCH trigger may occupy CPUs from the first symbol after the PDCCH until the last symbol of the PUSCH carrying the report.

A two-level priority may be defined for uplink (UL) channels in order to handle collisions. UL channels may be either of low priority or high priority. For example, for a PUCCH carrying HARQ-ACK, a priority may be given in downlink control information (DCI). For a distributed generation PUSCH, the priority may be given in the DCI. For a physical uplink control channel (PUCCH) carrying persistent CSI or semi-persistent CSI, the priority may always be low. For a PUSCH carrying aperiodic CSI, the priority may be given by an UL grant.

When a high priority UL transmission overlaps with a low priority UL transmission in a slot (known as pre-emption), the UE may be expected to cancel the low priority UL transmission. At least in the time domain, a high priority channel carrying CSI and a low priority channel carrying CSI cannot be multiplexed, and the UE cannot transmit both channels simultaneously. The UE may cancel the low priority transmission starting from $T_{proc,2}+d1$ after an end of a PDCCH scheduling the high priority transmission, where $T_{proc,2}$ corresponds to a UE processing time capability for the carrier. Value d1 is a time duration corresponding to 0, 1, or 2 symbols reported by a UE capability. Note that d2,d1=0 is for cancellation. A minimum processing time of the high priority channel is extended by d2 symbols, and value d2 is a time duration corresponding to 0, 1, or 2 symbols reported by a UE capability. An overlapping condition may be per repetition of the uplink transmission. Alternatively, the UE may receive a DCI format 2-4 message, which is for an uplink cancellation indication (ULCI) that may specify a set of time and frequency resources. The message may indicate to the UE that some resources allocated to the UE for uplink transmission should be cancelled. For example, if the UE receives this message and if the UE has uplink resources assigned to the UE that overlap with the set of time and frequency resources indicated by the ULCI, the UE may cancel transmission over the resources indicated by the ULCI.

A low priority UL communication by the UE may be cancelled by a high priority UL transmission, but what the UE is to do with CPUs corresponding to the cancelled UL communication is not defined. Handling what may now be wasted CPUs may lead to increased complexity for the UE, which may consume more power and processing resources.

According to some aspects described herein, if an uplink communication on a PUCCH or PUSCH carrying CSI is cancelled, the UE may release all CPUs taken by a CSI report on the PUCCH or PUSCH. In some aspects, the release may start from a first cancelled symbol or a first overlapping symbol (if due to uplink collision handling). This may save some time in providing all CSI reports. Alternatively, in some aspects, the UE may maintain all of the CPUs taken by the CSI report on the PUCCH or PUSCH as occupied until the last symbol of the PUCCH or PUSCH before cancellation. This may reduce complexity for the UE and save power and processing resources that may be consumed by freeing and reusing CPUs.

In some aspects, the UE may select between releasing the CPUs for the CSI report or maintaining the CPUs based at least in part on a capability of the UE. Some UEs may be capable of releasing CPUs once a cancellation occurs while other UEs may not be capable of releasing the CPUs. The UE may receive a configuration message from a base station that indicates whether the UE is to release the CPUs or maintain the CPUs. The UE may transmit a UE capability message to the base station, and the configuration message may be based at least in part on the UE capability.

Figure 4:
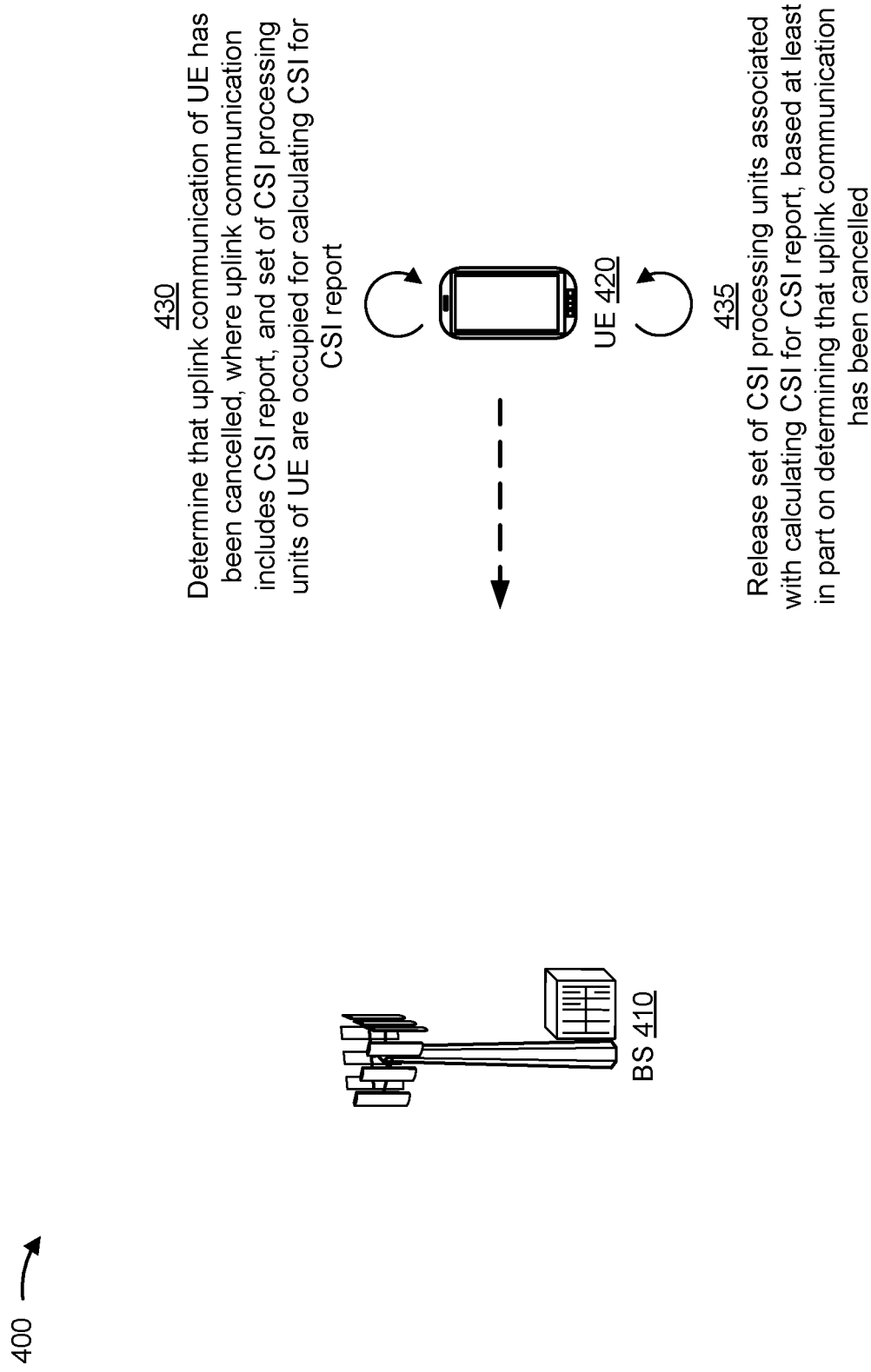
FIG. 4 is a diagram illustrating an example of channel state information (CSI) processing unit procedures for CSI report pre-emption, in accordance with various aspects of the present disclosure.

FIG. 4 is a diagram illustrating an example 400 of CSI processing unit procedures for CSI report pre-emption, in accordance with various aspects of the present disclosure. As shown in FIG. 4, a base station (BS) 410 (e.g., BS 110 depicted in FIGS. 1 and 2) and a UE 420 (e.g., UE 120 depicted in FIGS. 1 and 2) may communicate with one another.

UE 420 may receive a communication from BS 410 and prepare to calculate CSI for a CSI report that UE 420 may send in an uplink communication. The CSI report may include a report quantity (reportQuantity) information element that indicates quantities or parameters that are to be reported in the CSI report. In some aspects, the report quantity information element (IE) may indicate one or more other parameters that are to be reported in the CSI report, such as a rank indication (RI) parameter, a channel quality indication (CQI) parameter, a precoding matrix indication (PMI) parameter, a reference signal received power (RSRP) parameter, a layer indication (LI) parameter, and/or the like. For example, the report quantity IE may include a value of "cri-RI-PMI-CQI", "cri-RI-i1", "cri-RI-i1-CQI", "cri-RI-CQI", "cri-RSRP", "ssb-Index-RSRP", "cri-RI-LI-PMI-CQI", and/or the like.

As shown by reference number 430, UE 420 may determine that the uplink communication including the CSI report may be cancelled. For example, UE 420 may determine that the uplink communication is cancelled because the uplink communication may have a low priority and UE 420 may have received an uplink grant message for a high priority uplink communication. In another example, an aperiodic CSI may have priority over periodic CSI.

UE 420 may have a set of CPUs that are occupied for calculating CSI for the CSI report. As shown by reference number 435, UE 420 may release the CPUs associated with calculating CSI for the CSI report, based at least in part on determining that the uplink communication has been cancelled, as described above. In some aspects, UE 420 may determine that the uplink communication is cancelled based at least in part on receiving an indication to release the CPUs associated with the CSI report.

In some aspects, UE 420 may release the set of CPUs starting at a symbol that follows a time for preparing an uplink channel ($T_{proc,2}$) and a UE capability offset (d1) after receiving a grant message for a high priority uplink communication. If cancellation is due to detecting a ULCI in downlink control information, the UE may cancel its uplink transmission after $T_{proc,2}$ symbols after an end of a physical downlink control channel carrying the ULCI. UE 420 may have a UE capability for a quantity (e.g., a maximum number) of CPUs for processing CSI reports across all configured cells, sometimes referred to as a UE capability for a quantity (e.g., a maximum number) of simultaneous CSI calculations, either or both of which may be denoted as $N_{CPU}$. Offset d1 may be shorter for a UE with more capability and longer for a UE with less capability. In some aspects, UE 420 may release the set of CPUs starting at a first cancelled symbol of the uplink communication. The first cancelled symbol may be the first symbol of the uplink communication.

In some aspects, UE 420 may make one or more of the set of CSI processing units available for other CSI calculations. This may adjust a total number $N_{CPU}$ of available CPUs for other CSI reports.

As indicated above, FIG. 4 is provided as an example. Other examples may differ from what is described with respect to FIG. 4.

Figure 5:
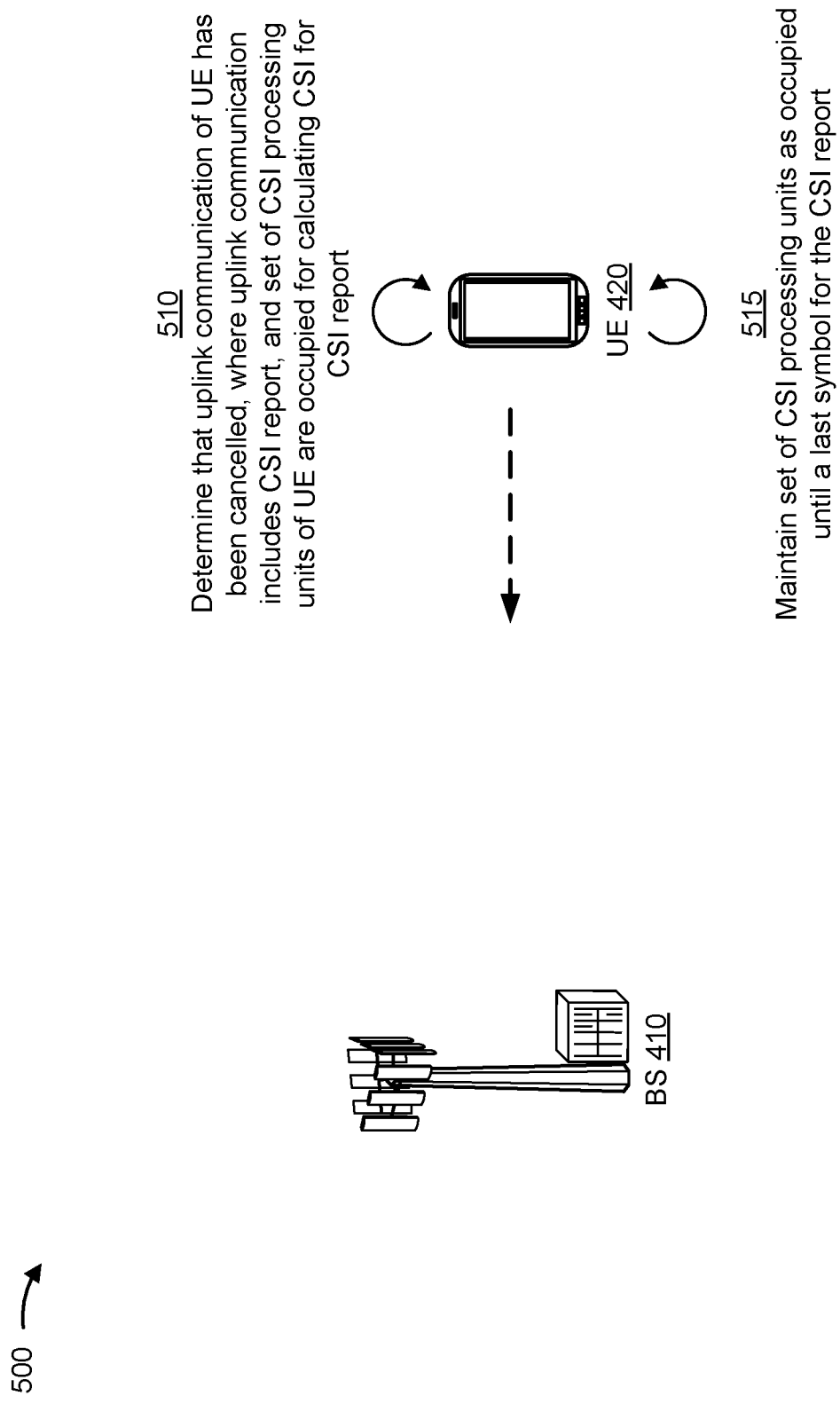
FIG. 5 is a diagram illustrating an example of CSI processing unit procedures for CSI report pre-emption, in accordance with various aspects of the present disclosure.

FIG. 5 is a diagram illustrating an example 500 of CSI processing unit procedures for CSI report pre-emption, in accordance with various aspects of the present disclosure. As shown in FIG. 5, BS 410 and UE 420 may communicate with one another.

As shown by reference number 510, UE 420 may determine that an uplink communication including the CSI report may be cancelled. UE 420 may have a set of CPUs that are occupied for calculating CSI for the CSI report. As shown by reference number 515, in some aspects, UE 420 may maintain the set of CSI processing units as occupied. This may be based at least in part on determining that the uplink communication has been cancelled. It may be less complex for UE 420 to maintain the set of CPUs as being occupied rather than take additional actions to release the CPUs or to make them otherwise available.

In some aspects, UE 420 may maintain the set of CSI processing units as occupied until a last symbol for the CSI report. In some aspects, UE 420 may maintain the set of CSI processing units as occupied until a last symbol of a PUSCH or PUCCH before cancellation. The PUSCH or PUCCH before cancellation may be considered to be a configured or scheduled PUSCH or PUCCH. For example, for a periodic or semi-persistent CSI report may be on a configured PUSCH or PUCCH. An aperiodic CSI report or a semi-persistent CSI report may be on a scheduled PUSCH. In some aspects, the set of CSI processing units may be occupied until a last symbol of the original channel, whether or nor the channel carrying the report is cancelled.

As indicated above, FIG. 5 is provided as an example. Other examples may differ from what is described with respect to FIG. 5.

Figure 6:
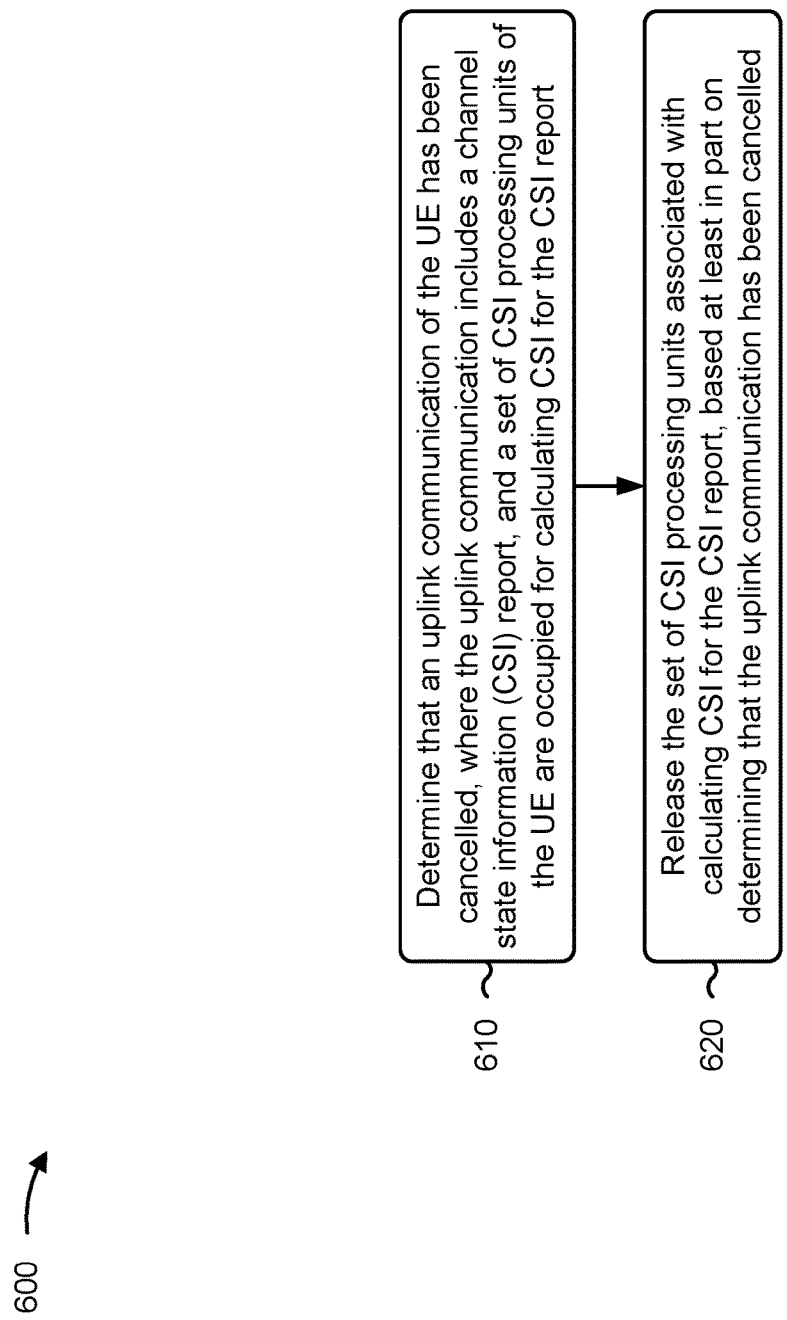
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 depicted in FIGS. 1 and 2, UE 420 depicted in FIGS. 4 and 5, and/or the like) performs operations associated with CSI processing unit procedures for CSI report pre-emption.

As shown in FIG. 6, in some aspects, process 600 may include determining that an uplink communication of the UE has been cancelled (block 610). For example, the UE (e.g., using receive processor 258, transmit processor 264, controller/processor 280, memory 282, and/or the like) may determine that an uplink communication of the UE has been cancelled, as described above. In some aspects, the uplink communication includes a CSI report. In some aspects, a set of CSI processing units of the UE are occupied for calculating CSI for the CSI report.

As further shown in FIG. 6, in some aspects, process 600 may include releasing the set of CSI processing units associated with calculating CSI for the CSI report, based at least in part on determining that the uplink communication has been cancelled (block 620). For example, the UE (e.g., using receive processor 258, transmit processor 264, controller/processor 280, memory 282, and/or the like) may release the set of CSI processing units associated with calculating CSI for the CSI report, based at least in part on determining that the uplink communication has been cancelled, as described above.

Process 600 may include additional aspects, such as any single aspect or any combination of aspects described below and/or in connection with one or more other processes described elsewhere herein.

In a first aspect, the uplink communication is a low priority uplink communication, and determining that the uplink communication has been cancelled includes determining that the uplink communication overlaps with a high priority uplink communication.

In a second aspect, alone or in combination with the first aspect, determining that the uplink communication has been cancelled includes receiving downlink control information with an uplink cancellation indication that specifies a set of time and frequency resources, and determining that the set of time and frequency resources overlap with time and frequency resources of the uplink communication.

In a third aspect, alone or in combination with one or more of the first and second aspects, releasing the set of CSI processing units includes releasing the set of CSI processing units starting at a symbol that follows a time for preparing an uplink channel and a UE capability offset after receiving a grant for a high priority communication.

In a fourth aspect, alone or in combination with one or more of the first through third aspects, releasing the set of CSI processing units includes releasing all CSI processing units used for the CSI report.

In a fifth aspect, alone or in combination with one or more of the first through fourth aspects, releasing the set of CSI processing units includes releasing CSI processing units at a symbol that follows a time for preparing an uplink channel after a last symbol of a physical downlink control channel where an uplink cancellation indication is detected.

In a sixth aspect, alone or in combination with one or more of the first through fifth aspects, releasing the set of CSI processing units includes releasing the set of CSI processing units starting at a first cancelled symbol of the uplink communication.

In a seventh aspect, alone or in combination with one or more of the first through sixth aspects, process 600 includes making the set of CSI processing units available for other CSI calculations.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
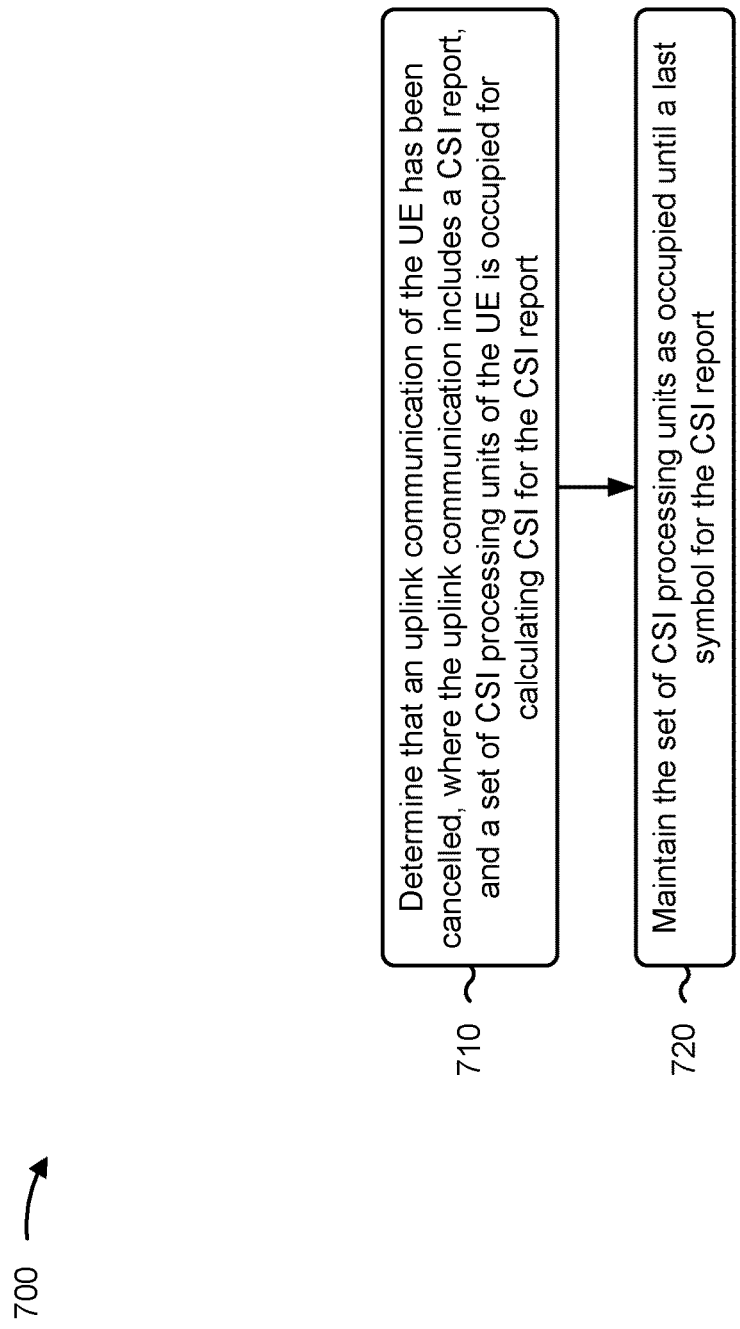
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1 and 2, UE 420 depicted in FIGS. 4 and 5, and/or the like) performs operations associated with CSI processing unit procedures for CSI report pre-emption.

As shown in FIG. 7, in some aspects, process 700 may include determining that an uplink communication of the UE has been cancelled (block 710). For example, the UE (e.g., using receive processor 258, transmit processor 264, controller/processor 280, memory 282, and/or the like) may determine that an uplink communication of the UE has been cancelled, as described above. In some aspects, the uplink communication includes a CSI report. In some aspects, a set of CSI processing units of the UE are occupied for calculating CSI for the CSI report.

As further shown in FIG. 7, in some aspects, process 700 may include maintaining the set of CSI processing units as occupied until a last symbol for the CSI report (block 720). For example, the UE (e.g., using receive processor 258, transmit processor 264, controller/processor 280, memory 282, and/or the like) may maintain the set of CSI processing units as occupied until a last symbol for the CSI report, as described above.

Process 700 may include additional aspects, such as any single aspect or any combination of aspects described below and/or in connection with one or more other processes described elsewhere herein.

In a first aspect, the uplink communication is a low priority uplink communication, and determining that the uplink communication of the UE has been cancelled includes determining that the uplink communication overlaps with a high priority uplink communication.

In a second aspect, alone or in combination with the first aspect, determining that the uplink communication has been cancelled includes receiving downlink control information that specifies a set of time and frequency resources, and determining that the set of time and frequency resources overlap with time and frequency resources indicate by a channel identifier.

In a third aspect, alone or in combination with the first and second aspects, maintaining the set of CSI processing units as occupied includes maintaining the set of CSI processing units as occupied until a last symbol on a configured or scheduled physical uplink channel (e.g., PUSCH or PUCCH) carrying the CSI report.

In a fourth aspect, alone or in combination with one or more of the first through third aspects, maintaining the set of CSI processing units as occupied includes maintaining the set of CSI processing units as occupied until a last symbol of a physical uplink channel (e.g., configured or scheduled PUSCH or PUCCH) before cancellation.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: determining that an uplink communication of the UE has been cancelled, wherein the uplink communication includes a channel state information (CSI) report, and wherein a set of CSI processing units of the UE are occupied for calculating CSI for the CSI report; and releasing the set of CSI processing units associated with calculating CSI for the CSI report, based at least in part on determining that the uplink communication has been cancelled.

Aspect 2: The method of aspect 1, wherein the uplink communication is a low priority uplink communication, and wherein determining that the uplink communication has been cancelled includes determining that the uplink communication overlaps with a high priority uplink communication.

Aspect 3: The method of aspect 1, wherein determining that the uplink communication has been cancelled includes receiving downlink control information with an uplink cancellation indication that specifies a set of time and frequency resources, and determining that the set of time and frequency resources overlap with time and frequency resources of the uplink communication.

Aspect 4: The method of any of aspects 1-3, wherein releasing the set of CSI processing units includes releasing the set of CSI processing units starting at a symbol that follows a time for preparing an uplink channel and a UE capability offset after receiving a grant for a high priority communication.

Aspect 5: The method of any of aspects 1-3, wherein releasing the set of CSI processing units includes releasing all CSI processing units used for the CSI report.

Aspect 6: The method of aspect 1, wherein releasing the set of CSI processing units includes releasing CSI processing units at a symbol that follows a time for preparing an uplink channel after a last symbol of a physical downlink control channel where an uplink cancellation indication is detected.

Aspect 7: The method of any of aspects 1-3, wherein releasing the set of CSI processing units includes releasing the set of CSI processing units starting at a first cancelled symbol of the uplink communication.

Aspect 8: The method of any of aspects 1-7, further comprising making the set of CSI processing units available for other CSI calculations.

Aspect 9: A method of wireless communication performed by a user equipment (UE), comprising: determining that an uplink communication of the UE has been cancelled, wherein the uplink communication includes a channel state information (CSI) report, and wherein a set of CSI processing units of the UE are occupied for calculating CSI for the CSI report; and maintaining the set of CSI processing units as occupied until a last symbol for the CSI report.

Aspect 10: The method of aspect 9, wherein the uplink communication is a low priority uplink communication, and wherein determining that the uplink communication of the UE has been cancelled includes determining that the uplink communication overlaps with a high priority uplink communication.

Aspect 11: The method of aspect 9, wherein determining that the uplink communication has been cancelled includes receiving downlink control information with an uplink cancellation indication that specifies a set of time and frequency resources, and determining that the set of time and frequency resources overlap with time and frequency resources of the uplink communication.

Aspect 12: The method of any of aspects 9-11, wherein maintaining the set of CSI processing units as occupied includes maintaining the set of CSI processing units as occupied until a last symbol on a configured or scheduled physical uplink channel carrying the CSI report.

Aspect 13: The method of any of aspects 9-12, wherein maintaining the set of CSI processing units as occupied includes maintaining the set of CSI processing units as occupied until a last symbol of a physical uplink channel before cancellation.

Aspect 14: An apparatus for wireless communication at a device, comprising a processor; memory coupled with the processor; and instructions stored in the memory and executable by the processor to cause the apparatus to perform the method of one or more aspects of aspects 1-13.

Aspect 15: A device for wireless communication, comprising a memory and one or more processors coupled to the memory, the memory and the one or more processors configured to perform the method of one or more aspects of aspects 1-13.

Aspect 16: An apparatus for wireless communication, comprising at least one means for performing the method of one or more aspects of aspects 1-13.

Aspect 17: A non-transitory computer-readable medium storing code for wireless communication, the code comprising instructions executable by a processor to perform the method of one or more aspects of aspects 1-13.

Aspect 18: A non-transitory computer-readable medium storing a set of instructions for wireless communication, the set of instructions comprising one or more instructions that, when executed by one or more processors of a device, cause the device to perform the method of one or more aspects of aspects 1-13.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that an uplink communication of the UE has been cancelled, wherein the uplink communication includes a channel state information (CSI) report, and wherein a set of CSI processing units of the UE are occupied for calculating CSI for the CSI report; and
    maintaining, based at least in part on cancelling the uplink communication, the set of CSI processing units as occupied until a last symbol for a channel that is scheduled or configured for the CSI report.

2. The method of claim 1, wherein the uplink communication is a low priority uplink communication, and wherein determining that the uplink communication of the UE has been cancelled includes determining that the uplink communication overlaps with a high priority uplink communication.

3. The method of claim 1, wherein determining that the uplink communication of the UE has been cancelled includes receiving downlink control information with an uplink cancellation indication that specifies a set of time and frequency resources, and determining that the set of time and frequency resources overlap with time and frequency resources of the uplink communication.

4. The method of claim 1, wherein maintaining the set of CSI processing units as occupied includes maintaining the set of CSI processing units as occupied until a last symbol on a configured or scheduled physical uplink channel carrying the CSI report.

5. The method of claim 1, wherein maintaining the set of CSI processing units as occupied includes maintaining the set of CSI processing units as occupied until a last symbol of a physical uplink channel before cancellation.

6. A user equipment (UE) for wireless communication, comprising:
    a memory; and
    one or more processors coupled to the memory, the one or more processors configured to:
        determine that an uplink communication of the UE has been cancelled, wherein the uplink communication includes a channel state information (CSI) report, and wherein a set of CSI processing units of the UE are occupied for calculating CSI for the CSI report; and
        maintain, based at least in part on cancelling the uplink communication, the set of CSI processing units as occupied until a last symbol for a channel that is scheduled or configured for the CSI report.

7. The UE of claim 6, wherein the uplink communication is a low priority uplink communication, and wherein the one or more processors, when determining that the uplink communication of the UE has been cancelled, are configured to determine that the uplink communication overlaps with a high priority uplink communication.

8. The UE of claim 6, wherein the one or more processors, when determining that the uplink communication of the UE has been cancelled, are configured to receive downlink control information with an uplink cancellation indication that specifies a set of time and frequency resources and determine that the set of time and frequency resources overlap with time and frequency resources of the uplink communication.

9. The UE of claim 6, wherein the one or more processors, when maintaining the set of CSI processing units as occupied, are configured to maintain the set of CSI processing units as occupied until a last symbol on a configured or scheduled physical uplink channel carrying the CSI report.

10. The UE of claim 6, wherein the one or more processors, when maintaining the set of CSI processing units as occupied, are configured to maintain the set of CSI processing units as occupied until a last symbol of a physical uplink channel before cancellation.

11. A non-transitory computer-readable medium storing a set of instructions for wireless communication, the set of instructions comprising:
    one or more instructions that, when executed by one or more processors of a user equipment (UE), cause the UE to:
        determine that an uplink communication of the UE has been cancelled, wherein the uplink communication includes a channel state information (CSI) report, and wherein a set of CSI processing units of the UE are occupied for calculating CSI for the CSI report; and maintain, based at least in part on cancelling the uplink communication, the set of CSI processing units as occupied until a last symbol for a channel that is scheduled or configured for the CSI report.

12. The non-transitory computer-readable medium of claim 11, wherein the uplink communication is a low priority uplink communication, and wherein the one or more instructions cause the UE to determine that the uplink communication of the UE has been cancelled includes determining that the uplink communication overlaps with a high priority uplink communication.

13. The non-transitory computer-readable medium of claim 11, wherein the one or more instructions cause the UE to receive downlink control information with an uplink cancellation indication that specifies a set of time and frequency resources and determine that the set of time and frequency resources overlap with time and frequency resources of the uplink communication.

14. The non-transitory computer-readable medium of claim 11, wherein the one or more instructions cause the UE to maintain the set of CSI processing units as occupied until a last symbol on a configured or scheduled physical uplink channel carrying the CSI report.

15. The non-transitory computer-readable medium of claim 11, wherein the one or more instructions cause the UE to maintain the set of CSI processing units as occupied until a last symbol of a physical uplink channel before cancellation.

16. An apparatus for wireless communication, comprising:

means for determining that an uplink communication of the apparatus has been cancelled, wherein the uplink communication includes a channel state information (CSI) report, and wherein a set of CSI processing units of the apparatus are occupied for calculating CSI for the CSI report; and means for maintaining, based at least in part on cancelling the uplink communication, the set of CSI processing units as occupied until a last symbol for a channel that is scheduled or configured for the CSI report.

17. The apparatus of claim 16, wherein the uplink communication is a low priority uplink communication, and wherein determining that the uplink communication of the apparatus has been cancelled includes determining that the uplink communication overlaps with a high priority uplink communication.

18. The apparatus of claim 16, wherein the means for determining that the uplink communication of the UE has been cancelled includes means for receiving downlink control information with an uplink cancellation indication that specifies a set of time and frequency resources, and determining that the set of time and frequency resources overlap with time and frequency resources of the uplink communication.

19. The apparatus of claim 16, wherein the means for maintaining the set of CSI processing units as occupied includes means for maintaining the set of CSI processing units as occupied until a last symbol on a configured or scheduled physical uplink channel carrying the CSI report.

20. The apparatus of claim 16, wherein the means for maintaining the set of CSI processing units as occupied includes means for maintaining the set of CSI processing units as occupied until a last symbol of a physical uplink channel before cancellation.

* * * * *